United States Patent [19]

Asano

[11] Patent Number: 4,587,532

[45] Date of Patent: May 6, 1986

[54] RECORDING APPARATUS PRODUCING MULTIPLE COPIES SIMULTANEOUSLY

[75] Inventor: Junichi Asano, Hoya, Japan

[73] Assignee: Canon Kabushiki Kaisha, Tokyo, Japan

[21] Appl. No.: 603,939

[22] Filed: Apr. 26, 1984

[30] Foreign Application Priority Data

May 2, 1983 [JP] Japan .................................. 58-78002
May 6, 1983 [JP] Japan .................................. 58-79063

[51] Int. Cl.[4] ...................... G01D 15/24; B65H 39/10; G03G 15/00; B41J 13/00

[52] U.S. Cl. ...................................... 346/134; 346/44; 101/90; 101/93.08; 101/93.11; 271/4; 271/253; 271/303; 271/305; 355/14 SH; 355/24; 355/89; 400/578; 400/605

[58] Field of Search ......................... 346/44, 134, 160; 101/93.08, 90, 93.11, 113; 271/4, 293, 303, 305, 226; 355/14 SH, 24, 89; 400/578, 605

[56] References Cited

U.S. PATENT DOCUMENTS 3,418,927 12/1968 Mita ...................................... 101/90
4,431,322 2/1984 Nally et al. ......................... 400/605

OTHER PUBLICATIONS

IBM, Tech. Disc. Bull., vol. 25, No. 6, 11-82, Howell, Method to Measure Various Paper Flow Parameters.

*Primary Examiner*—E. A. Goldberg
*Assistant Examiner*—Gerald E. Preston
*Attorney, Agent, or Firm*—Fitzpatrick, Cella, Harper & Scinto

[57] ABSTRACT

The present invention provides a recording apparatus including a plurality of printers each for reproducing an image on a recording sheet upon receiving the same signal, and a single sheet delivering device for delivering recording sheets to the printers. The present invention also provides a recording apparatus including a plurality of printers each for reproducing an image on a recording sheet upon receiving the same signal, and a sheet discharge device for feeding the recording sheets from the printers to a collector or sorter.

6 Claims, 9 Drawing Figures

RECORDING APPARATUS PRODUCING MULTIPLE COPIES SIMULTANEOUSLY

BACKGROUND OF THE INVENTION

1. Field of the Invention

The present invention relates to a recording apparatus including means that upon receiving the same signal, delivers recording sheets to a plurality of printers each of which reproduces an image on a recording sheet or for collects the recording sheets from the printers.

2. Description of the Prior Art

There are currently used copying machines of such a type that an original to be copied is imaged directly on a photosensitive member, and the image is visualized and transferred onto a copy sheet. In these copying machines, a single scan relative to the original provides only a single copy so that the copying speed is low. To increase the speed or rate of copy (efficiency), the copying machine must be driven at an increased speed. However, the increased speed brings about various problems with respect to the sensitivity of the photosensitive member, the processes for developing, cleaning, transferring and other processes limited by the mechanical construction. Therefore, it is, in fact, impossible to increase the speed of the copying machines more than a certain amount.

A digital type copying machine has been proposed to improve the efficiency of copying without increase of the speed of copying. Such a digital copying machine comprises a reader as shown in FIG. 1, in which an original is illuminated by a fluorescent lamp a and imaged on charge coupled elements c through an optical system b. Each of the charge coupled elements then generates an electrical signal which is in turn supplied to a known printer shown in FIG. 2 for directly printing on an electrostatic recording sheet or which is converted into a photo-signal to be recorded on a copy sheet through an electrophotographic process. The electrical signals can be supplied to a plurality of printers $P_1$, $P_2$ and $P_3$ as shown in FIG. 3 so that a plurality of copy sheets will simultaneously be copied. In such an arrangement of the prior art, however, each of the printers has its own sheet delivering device, that is, a cassette $K_1$, $K_2$ and $K_3$. If each of the cassettes becomes empty, that cassette must be re-supplied independently in a cumbersome operation.

Further, in such a copying machine, since the original image is converted into an electrical signal, which can be supplied to each of the printers $P_1$, $P_2$ and $P_3$ as shown in FIG. 4, it is possible to obtain a plural number of copies so that the copying efficiency is improved without changing the driving speed of the copying machine. However in this case, since a plurality of printers are used, they must have the respective sheet receiving trays as shown by $T_1$, $T_2$ and $T_3$ in FIG. 4. This means that the copied sheets from the respective printers should be collected from each of the trays in a troublesome operation. Since a single tray is disposed relative to each of the printers, no sorter can be connected with this type of copying machines.

SUMMARY OF THE INVENTION

It is therefore an object of the present invention to provide a recording apparatus comprising a single sheet delivering device for delivering copy sheets to a plurality of printers or a sheet discharging device for successively conveying copied sheets from the respective printers to a preselected tray or a sorter without overlapping.

This object can be accomplished by providing a recording apparatus comprising a plurality of printers each for reproducing an image on a recording sheet upon receiving the same signal, and a single sheet delivering device for delivering recording sheets to the printers or by providing a recording apparatus comprising a plurality of printers each for reproducing an image on a recording sheet upon receiving the same signal, and a sheet discharging device for conveying the recording sheet from each of the printers to a collector or sorter.

In accordance with the present invention, recording sheets contained within the sheet delivering device can automatically be delivered to each of the printers without need of any complicated delivery operation for each printer. In accordance with the present invention, further, the recording sheets substantially simultaneously discharged from the printers can securely be conveyed to a preselected tray or a sorter by the sheet discharging device without overlapping.

DESCRIPTION OF THE PREFERRED EMBODIMENTS

The present invention will now be described by way of example with reference to FIGS. 5 and 6.

Figure 1:
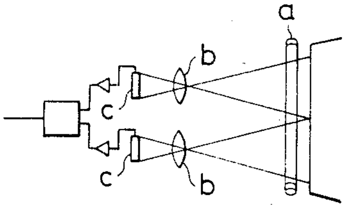
FIG. 1 illustrates a reader.
Figure 2:
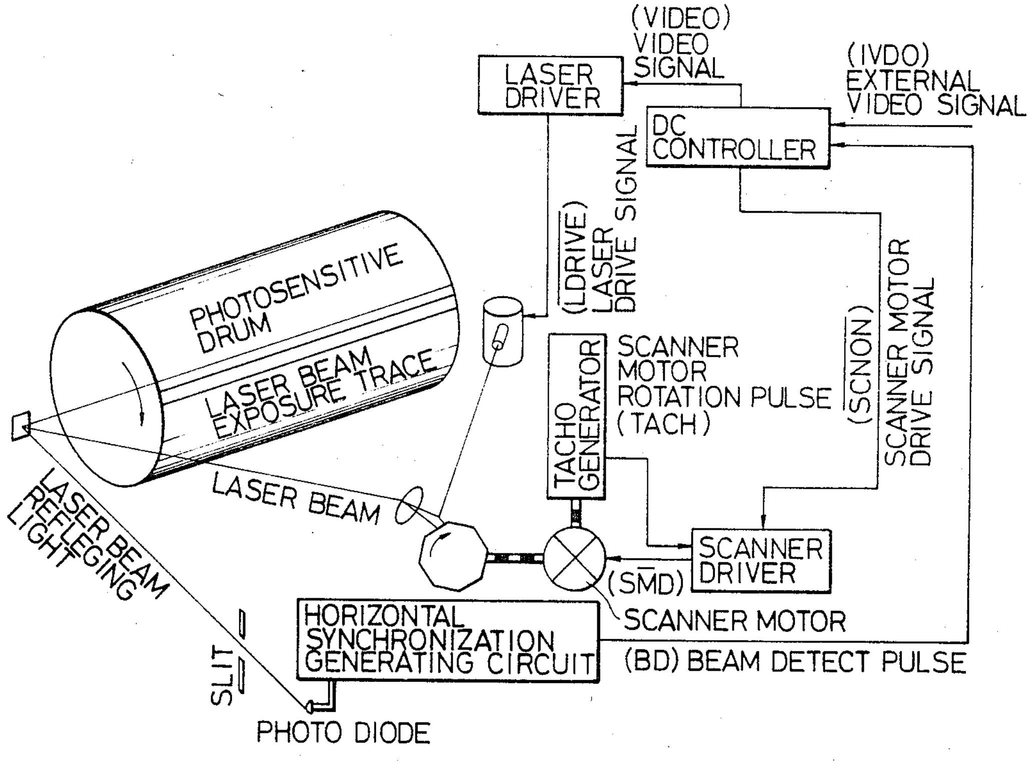
FIG. 2 is a schematic view showing the details of a printer.
Figure 3:
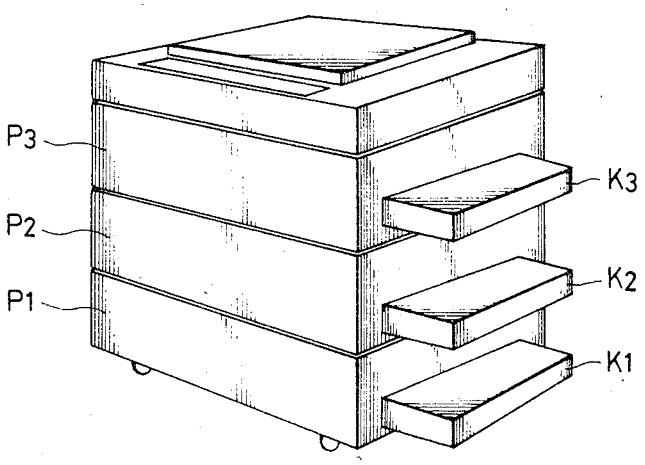
FIG. 3 is a perspective view showing copying machine including a plurality of printers and sheet delivering devices provided for the respective printers.
Figure 4:
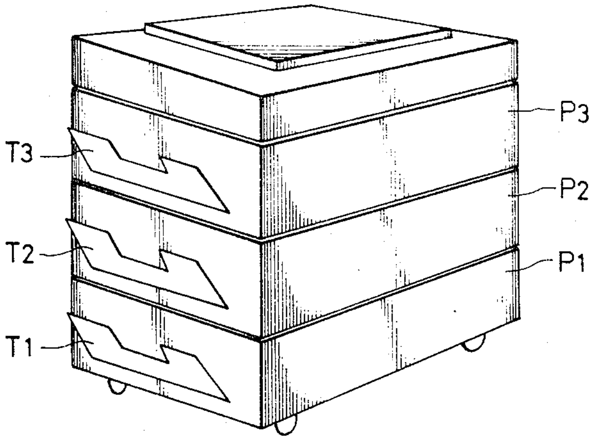
FIG. 4 is a perspective view of the copying machine showing a plurality of sheet discharging devices provided for the respective printers.
Figure 5:
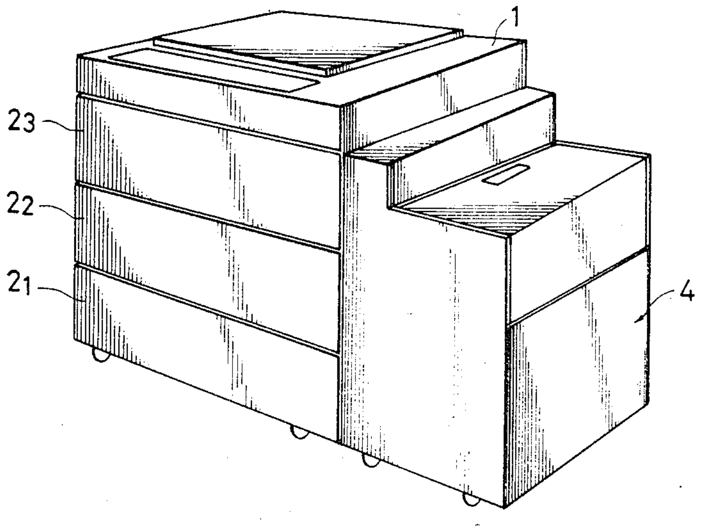
FIG. 5 is a perspective view of a recording apparatus according to one embodiment of the present invention.
Figure 6:
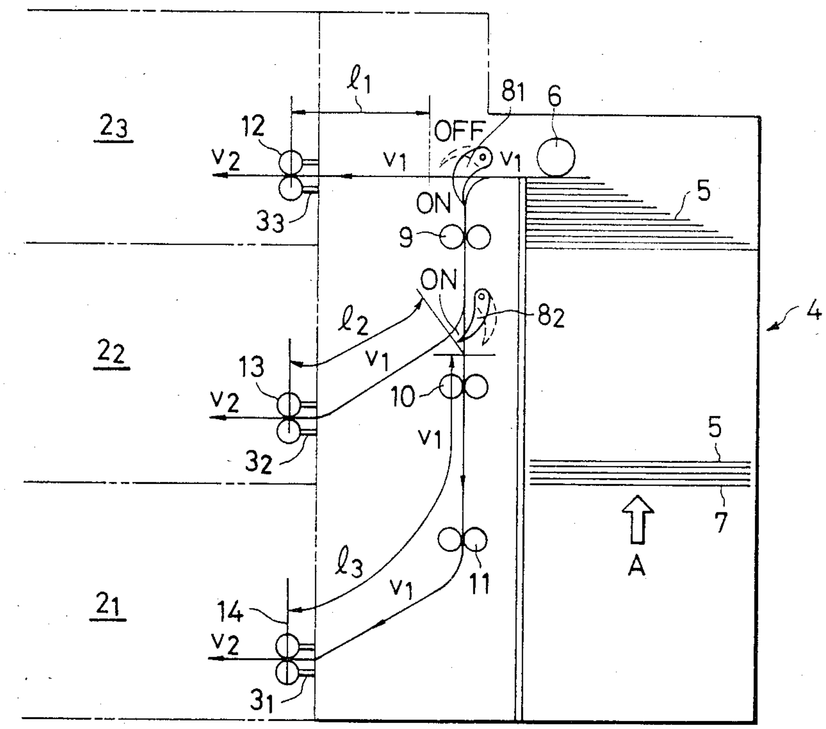
FIG. 6 illustrates the in detail the mechanism of a sheet delivering device used in the recording apparatus according to the present invention.

Referring to FIGS. 5 and 6, a recording apparatus according to the present invention comprises a reader 1 under which three printers $2_1$, $2_2$ and $2_3$ of the same structure are disposed one above another. Each of the printers has a sheet inlet $3_1$, $3_2$ or $3_3$ at one side. The recording apparatus also comprises a sheet delivering device 4 for delivering recording sheets to the sheet inlets $3_1$, $3_2$ and $3_3$ of the respective printers. The sheet delivering device 4 contains a great number of recording sheets 5 therein with the uppermost recording sheet being resiliently urged against a feed roller 6 through a pushing-up plate 7. Upon rotation of the feed roller 6, the recording sheets 5 are outwardly moved one at a time from the sheet delivering device 4. Each of the recording sheets from the sheet delivering device 4 is selectively directed to one of the printers $2_1$, $2_2$ and $2_3$ through the inlets $3_1$, $3_2$ and $3_3$ by means of diverting pawls $8_1$ and $8_2$. The top printer $2_3$ receives the recording sheet directly from the sheet delivering device 4 when the diverting pawl $8_1$ is in its open position as shown by the broken line in FIG. 6. When the diverting pawls $8_1$ and $8_2$ are in their positions as shown by solid lines in FIG. 6, the recording sheet is delivered to the sheet inlet $3_2$ of the intermediate printer $2_2$ through a pair of conveying rollers 9. When the diverting pawl $8_1$ is in its solid-line position and the diverting pawl $8_2$ is in its broken-line position, the recording sheet is delivered to the sheet inlet $3_1$ of the bottom printer $2_1$ through two pairs of conveying rollers 10 and 11.

Each of the printers $2_1$, $2_2$ and $2_3$ includes a pair of registration rollers 14, 13 or 12 at the sheet inlet $3_1$, $3_2$ or $3_3$, which serves to feed the recording sheet into the corresponding printer in synchronism with the actuation thereof.

Now supposing that the speed of a recording sheet 5 conveyed by the feed roller 6 and the conveying rollers 9, 10 and 11 is $v_1$, the speed of the recording sheet moved by the registration rollers 12, 13 and 14 is $v_2$, the length of the recording sheet 5 is l, a distance from one sheet to the succeeding sheet being moved into a printer is S, and the number of printers used is n, the following relationship is fulfilled:

$$v_1 > \frac{n \times l \times v_2}{l \times S} \quad (1)$$

Also assuming that a distance between the registration roller pair 12 and the diverting pawl $8_1$ is $l_1$, a distance between the registration roller pair 13 and the diverting pawl $8_2$ is $l_2$, and a distance between the registration roller pair 14 and the diverting pawl $8_2$ is $l_3$, the sheet delivering device is so arranged to fulfill the following relationship:

$$l_1, l_2, l_3 > l \quad (2)$$

The sheet delivering device will more particularly be described with respect to its operation. When the sheet delivering device 4 receives a sheet delivery signal, a first recording sheet 5 is fed out of the sheet delivering device 4 under the actuation of the feed roller 6. If the diverting pawl $8_1$ is in its off position, the first recording sheet is directed to and stopped at the registration roller pair 12. When a second recording sheet 5 is delivered from the sheet delivering device 4, the diverting pawl $8_1$ is placed in its ON position and the diverting pawl $8_2$ also is placed in its ON position. Thus, the second recording sheet 5 is directed to the intermediate printer $2_2$ and blocked by the registration roller pair 13. When a third recording sheet is delivered, the diverting pawl $8_1$ remains at its ON position and the diverting pawl $8_2$ is shifted to its OFF position. Thus, the third recording sheet is directed to the bottom printer $2_1$ and then blocked by the registration roller pair 14. If the three printers are to be actuated at random, any one of the printers generates an instruction signal used to actuate the corresponding registration roller pair such that the recording sheet blocked thereby will be fed into that printer. A similar cycle will be repeated as far as the sheet delivery signal is being generated.

If the three printers are to be synchronously operated, the first, second and third recording sheets are simultaneously released and fed into the respective printers when the respective registration roller pairs begin to rotate in response to instruction signals from the printers. A similar cycle will be repeated so far as the instruction signals are being generated.

When a recording sheet is moved from the sheet delivering device 4 to each of the registration roller roller pairs, the speed of the recording sheet is set to be at a speed $v_1$ mm/sec. After the recording sheet has passed through the registration roller pair, the recording sheet is moved at a speed of $v_2$ mm/sec. This corresponds to the process speed in the printer. If the sheet delivering device is arranged to fulfill the above relationships (1) and (2), therefore, all the printers can receive the respective recording sheet during one cycle so that the printing will not be missed in each of the printers. A distance between each of the registration roller pairs and the corresponding diverting pawl is larger than the length of the recording sheet such that the latter can be blocked until a new recording sheet is delivered to that registration roller pair. As described hereinbefore, the recording sheets are successively delivered to the printers starting from the one having the shortest path of sheet conveyance. Therefore, the printers can be followed by the sheet delivering device 4 at the minimum speed $v_1$ so that the sheet conveying system can have an improved factor of safety.

The afore-mentioned relationship (1) will now be derived. First of all, suppose that the printers $2_1$, $2_2$, $2_3$ . . . $2_n$ are substantially synchronously operated since they are triggered by the same signal. The sheet delivering device 4 must deliver sheets to the respective inlets (registration roller pairs) of all the printers n, within one cycle ($t_1$) in the continuous print mode. Now assuming that the process speed of the printers is $v_2$, the length of the recording sheets is l and a distance between each adjacent recording sheets successively conveyed is S, the following relationship is fulfilled:

$$t_1 = (l+S)/v_2 \quad (3)$$

If it is also supposed that the time $t_2$ required to deliver the recording sheets from the sheet delivering device to all (n) of the printers is attained at the speed $v_1$ at which the sheet delivering device delivers a recording sheet, without any additional path of conveyance, the following relationship is obtained:

$$t_2 = n \times l/V_1 \quad (4)$$

When the printers $2_1$, $2_2$ . . . $2_n$ are continuously operated, the sheet delivering device must deliver recording sheets to all the printers within one cycle ($t_1$) for each printer. Namely, the following relationship must be satisfied:

$$t_1 > t_2 \quad (5)$$

Therefore, $$(l+S)/v_2 > n \times l/v_1,$$

and then $$v_1 > \frac{n \times l}{l + S} \times v_2.$$

Figure 7:
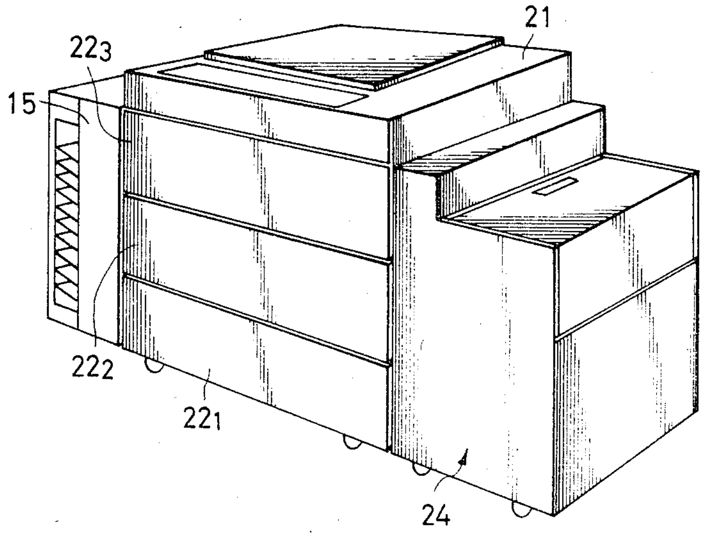
FIG. 7 is a perspective view showing the recording apparatus of FIG. 5 with which a sorter is combined.

FIG. 7 shows the recording apparatus including a sorter 15 mounted thereon at the discharge side.

Figure 8:
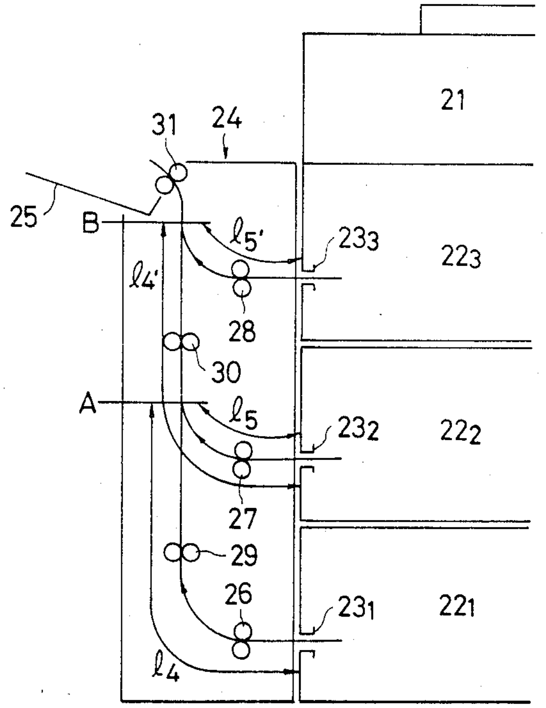
FIG. 8 is a schematic illustration of a copying machine in which a sheet discharging device according to another embodiment of the present invention is assembled; thereto
Figure 9:
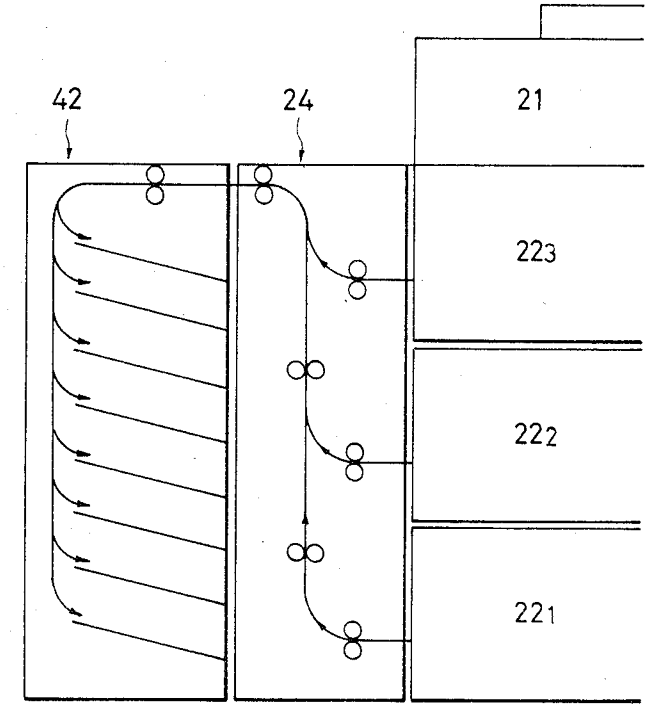
FIG. 9 is a schematic illustration of still another embodiment according to the present invention.

FIGS. 8 and 9 show further embodiments of the present invention.

The further embodiment shown in FIG. 8 comprises a reader 21 under which three printers $22_1$,$22_2$ and $22_3$ having the same structure are disposed one above another. Each of the printers has a sheet outlet $23_1$, $23_2$ or $23_3$ located at one side. This further embodiment also comprises a sheet discharging device 24 for conveying recording sheets from the sheet outlets $23_1$, $23_2$, and $23_3$ of the respective printers to a sheet receiving tray 25. The sheet discharging device 24 includes a plurality of conveying roller pairs 26, 27, 28, 29, 30 and 31 which serve to convey the recording sheets from the respective printers to the tray 25. In FIG. 8, a symbol A represents the junction of the paths of conveyance from the bottom and intermediate printers $22_1$ and $22_2$; B the junction of the paths of conveyance from the intermediate and top printers $22_2$ and $22_3$; $l_4$ the distance of the conveyance path from the sheet outlet $23_1$ of the bottom printer $22_1$ to the junction A; $l_5$ the distance of the conveyance path from the sheet outlet $23_2$ of the intermediate printer $22_2$ to the junction A; $l_5'$ the distance of the conveyance path from the sheet outlet $23_3$ of the top printer $22_3$ to the junction B; and $l_4'$ the distance of the conveyance path from the sheet outlet $23_2$ of the intermediate printer $22_2$ to the junction B.

This sheet discharging device 24 is sized and configured such that the following relationships will be fulfilled:

$$l_4 - l_5 > l' \text{ and } l_4' - l_5' > l'$$

where l' is the maximum length of the recording sheets used in this copying machine.

In the above copying machine, an original is read by the reader 21 which in turn generates electrical signals. These electrical signals are supplied to the printers $22_1$, $22_2$ and $22_3$ which are in turn operated to print the respective recording sheets simultaneously. The printed recording sheets are then the fed into the sheet discharging device 24. Since the sheet discharging device 24 has the above-mentioned relationships, the trailing edge of the recording sheet from the intermediate printer $22_2$ has passed through junction A when the leading edge of the recording sheet from the bottom printer $22_1$ reaches the junction A. Similarly, the trailing edge of the recording sheet from the top printer $22_3$ has passed through the junction B when the leading edge of the recording sheet from the intermediate printer $22_2$ reaches the junction B. Thus, the recording sheets from the respective printers will not be overlapped with one another. As a result, the tray 25 will receive the recording sheets from the respective printers in a properly stacked condition. Such an advantage enables the sheet discharging device 24 to combined with a sorter 42 as shown in FIG. 9. Alternatively, the sheet discharging device 24 may be combined with a stacker having a large capacity which can properly stack a great number of recording sheets. In such a case, there is the following relationship between a speed $v_4$ at which a recording sheet is fed out of the sheet discharging device 24 and a speed $v_5$ at which the recording sheet is discharged from a printer:

$$v_4 > n \cdot \frac{l}{l+S} \cdot v_5 \qquad (6)$$

where l is the length of the recording sheet; S is a spacing between each adjacent recording sheets from the printer; and n is the number of printers. If this relationship is not satisfied, a preceding sheet would be overlapped by a succeeding sheet in the continuous print mode. The above relationship is thus essential in the continuous print mode except that the cycle of printing is sufficiently extended. Since n is equal to three in the embodiment illustrated in FIG. 9, the size and configuration are determined to fulfill $$v_4 \geqq 3 \times \frac{l}{l+S} \times v_5.$$

Therefore, there is no overlap even in the continuous print mode.

The above relationship (6) will now be derived. The printers, n in number, are synchronously operated since they are triggered by the same signal. If the recording sheets are substantially simultaneously discharged from the sheet outlets $23_1$, $23_2$ and $23_3$ of the printers, the sheet discharging device must convey the recording sheets from the respective printers to the tray within one cycle ($t_4$) in the continuous print mode. Now supposing that the speed of a recording sheet discharged from a printer is $v_5$; the length of the recording sheet is l and the distance between each adjacent recording sheets discharged from the printer is S, $$t_4 = (l+S)/v_5 \qquad (7)$$

Also assuming that time required to convey the n recording sheets from the sheet discharging device is $t_5$; and a speed of the recording sheet conveyed by the sheet discharging device is $v_4$, $$t_5 = n \times l / v_4 \qquad (8)$$

If $t_4 > t_5$, therefore, a recording sheet discharged from a printer will not be overlapped with a succeeding recording sheet. Thus, $$(l+S)/v_5 > n \times l / v_4$$

Accordingly, $$v_4 > \frac{n \times l}{l+S} \cdot v_5.$$

Thus, the present invention provides a recording apparatus comprising a plurality of printers each for reproducing an image on a recording sheet upon receiving the same signal, and a sheet discharging device for conveying the recording sheets from the respective printers to a collector or sorter, said apparatus being characterized in that the path of conveyance for the recording sheets is determined to be:

$$|l_4 - l_5| > l$$

where $l_4$ is a distance from the sheet outlet of the n-th printer to the junction of a recording sheet from the n-th printer with a recording sheet from the n+1-th printer; and $l_5$ is a distance from the sheet outlet of the n+1-th printer to said junction. Thus, the sheet discharging device can convey recording sheets substantially simultaneously discharged from the respective printers without overlapping so that the recording sheets can properly be fed into the tray in a stacked condition or positively be conveyed into the sorter.

What I claim is:

1. A recording apparatus for printing on recording sheets, said apparatus comprising:

means for generating a signal representing an image;

a plurality of printers each for reproducing simultaneously the same image on each recording sheet upon receiving the same signal produced by said generating means;

a single sheet delivering device for supplying the recording sheets; and a plurality of register means each associated with one said printer for receiving recording sheets from said sheet delivering device and for feeding recording sheets through said associated printer, each said register means including means for stopping conveyed recording sheets before entry into said associated printer to align the leading edges thereof, and for conveying recording sheets simultaneously into said printers in synchronism with the operation of said printers.

2. A recording apparatus according to claim 1, wherein said apparatus is constructed so as to satisfy the following relationship:

$$v_1 > \frac{n \cdot l}{l + S} v_2$$

where $v_1$ l is the speed of the recording sheet conveyed from said sheet delivering device to each of said register means; $v_2$ is the speed of the recording sheet fed through each said printer; l is the length of the recording sheet; S is a spacing between each adjacent recording sheets successively conveyed; and n is the number of said printers.

3. A recording apparatus for printing on recording sheets, said apparatus comprising:

means for generating a signal representing an image;

a plurality of printers each for reproducing simultaneously the same image on each recording sheet upon receiving the same signal produced by said generating means, each said printer having a sheet outlet from which sheets are discharged after an image is reproduced thereon;

a signle sheet receiving tray for receiving recording sheets upon which an image is reproduced by said printers; and a sheet discharging device for conveying the recording sheets from said outlet from each said printer to said sheet receiving tray, said sheet discharging device defining at least a part of an individual path of conveyance corresponding to said sheet outlet from each said printer, said paths of conveyance to said sheet receiving tray being different in length from each other.

4. A recording apparatus according to claim 3, wherein said sheet discharging device is configured so that said paths of conveyance for the recording sheets satisfy the following relationship:

$$|l_4 - l_5| > l$$

where $l_4$ is a distance from the sheet outlet of the (n)-th printer to a junction of the recording sheet discharged from the (n)-th printer with the recording sheet discharged from the (n+1-th printer; $l_5$ is a distance from the sheet outlet of the (n+1)-th printer to said junction; and l is the length of the recording sheets.

5. A recording apparatus according to claim 3, wherein said apparatus is constructed to satisfy the following relationship:

$$v_4 > \frac{n \cdot l}{l + S} v_5$$

where $v_5$ is the speed at which a recording sheet is discharged from said outlet from each said printer; $v_4$ is the speed at which the recording sheet is conveyed by said sheet discharging service; l is the length of the recording sheet; S is a spacing between each adjacent sheets successively conveyed; and n is the number of said printers.

6. A recording apparatus for printing on recording sheets, said apparatus comprising:

means for generating a signal representing an image;

a plurality of printers each for reproducing simultaneously the same image on each recording sheet upon receiving the same signal produced by said generating means, each said printer having a sheet outlet from which sheets are discharged after an image is reproduced thereon;

a signal sheet delivering device for supplying the recording sheets;

a plurality of register means each associated with one said printer, for receiving recording sheets from said sheet delivering device, and for feeding recording sheets through said associated printer, each of said register means including means for stopping conveyed recording sheets before entry into said associated printer to align the leading edges thereof, and for conveying recording sheets simultaneously into said printers in synchronism with the operation of said printers;

a single sheet receiving tray for receiving the recording sheets upon which an image is reproduced by said printers; and a sheet discharging device for conveying the recording sheets from said outlet from each said printer to said sheet receiving tray, said sheet discharging device defining at least a part of an individual path of conveyance corresponding to said sheet outlet from each said printer, said paths of conveyance to said sheet receiving tray being different in length from each other.

* * * * *

UNITED STATES PATENT AND TRADEMARK OFFICE
CERTIFICATE OF CORRECTION

PATENT NO. : 4,587,532

DATED : May 6, 1986

INVENTOR(S) : Junichi Asano

It is certified that error appears in the above-identified patent and that said Letters Patent is hereby corrected as shown below:

Column 1, line 8, change "that upon" to --that, upon--;
line 11, change "or for collects" to --or collects--; and Column 1, line 61, change "machines." to --machine.--.

Column 2, line 35, change "illustrates the in" to --illustrates in--; and
line 43, change "assembled; thereto and" to --assembled thereto; and--.

Column 3, line 45, change "off" to --OFF--; and
line 62, change "far" to --long--.

Column 4, line 1, change "far" to --long--;
lines 4-5, change "registration roller roller pairs," to --registration roller pairs,--;
line 25, change "afore-mentioned" to --aforementioned--; and
line 34, change "sheets" to --sheet--.

UNITED STATES PATENT AND TRADEMARK OFFICE

CERTIFICATE OF CORRECTION

PATENT NO. : 4,587,532

DATED : May 6, 1986

INVENTOR(S) : Junichi Asano

It is certified that error appears in the above-identified patent and that said Letters Patent is hereby corrected as shown below:

Column 5, line 37, change "then the fed" to --then fed--; and line 66, change "sheets" to --sheet--.

Column 6, line 23, change "1 and" to --1; and--; and line 35, change "$t_5$, therefore, a" to --$t_5$, a--.

Column 7, line 28, change "$v_1$1 is" to --$v_1$ is--; line 33, change "sheets" to --sheet--; and line 45, change "signle" to --single--.

Column 8, line 8, change "(n+1-th" to --(n+1)-th--; line 23, change "sheets" to --sheet--; and line 34, change "signal" to --single--.

Signed and Sealed this

Sixth Day of January, 1987

*Attest:*

DONALD J. QUIGG

*Attesting Officer*

*Commissioner of Patents and Trademarks*